(12) United States Patent
Park

(10) Patent No.: US 6,847,705 B2
(45) Date of Patent: Jan. 25, 2005

(54) APPARATUS FOR RECEIVING VOICE SIGNAL AND DATA AND CONTROLLING METHOD THEREOF

(75) Inventor: Kun Kook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 144 days.

(21) Appl. No.: 10/160,480

(22) Filed: May 31, 2002

(65) Prior Publication Data

US 2002/0181677 A1 Dec. 5, 2002

(30) Foreign Application Priority Data

Jun. 1, 2001 (KR) .......................................... 2001-30854

(51) Int. Cl.$^7$ ............................................ H04M 11/00
(52) U.S. Cl. .................. 379/93.07; 379/90.01; 379/395.01; 379/413.02; 370/352
(58) Field of Search ................ 379/90.01, 93.05–93.07, 379/387.01, 395.01, 399.01, 413.02, 9.05, 27.06; 370/352, 493

(56) References Cited

U.S. PATENT DOCUMENTS 6,400,803 B1 * 6/2002 Tate et al. ............... 379/27.06
6,647,024 B1 * 11/2003 Dombkowski et al. ..... 370/493

* cited by examiner

*Primary Examiner*—Wing F Chan
(74) *Attorney, Agent, or Firm*—Lee, Hong, Degerman, Kang & Schmadeka

(57) ABSTRACT

An apparatus for receiving a voice signal and data, and a controlling method thereof, by which a voice telephone call can be made even in power failure, network error, or CPU error, comprises: a splitter for dividing data transmitted from a data transmission unit into an internet protocol data packet and a voice signal; a first telephone connected to an analog POTS channel of the splitter for receiving the voice signal divided in the splitter; and an integrated access device (IAD) for connecting a second telephone to a voice line, that is, the analog POTS channel of the splitter or connecting the second telephone to a data line of the splitter according to state of power failure.

11 Claims, 3 Drawing Sheets

APPARATUS FOR RECEIVING VOICE SIGNAL AND DATA AND CONTROLLING METHOD THEREOF

BACKGROUND OF THE INVENTION

1. Field of the Invention

The present invention relates to an apparatus for receiving a voice signal and data, and a controlling method thereof, and particularly, to an apparatus for receiving voice signal and data, and controlling method thereof by which a voice call can be performed even in power failure, or disorder of central processing unit (CPU) or network.

2. Description of the Background Art

Conventional switching network dealt with a voice service mainly, however, economical efficiency and service quality are improved recently by digitizing the switching operation. And at the same time, an integrated services digital network (ISDN) of 64 Kbps which integrates a circuit switching and a packet switching is able to be served.

However, requirements of user become advanced, diverse, and personalized, therefore, information of high speed and large capacity such as moving picture is needed to be transmitted. In order to satisfy the qualities required by various services and accept all services in a single communication network, an asynchronous transfer mode (ATM) which is able to process large range of bands from a narrow band ISDN service to a broad band video service.

The ATM communication method is a switching technology in broad-band ISDN (B-ISDN), and provides various services according to different traffic characteristics and system conditions using an ATM adoption layer (AAL).

The AAL is divided into AAL1, AAL2, AAL3/4, and AAL5 according to the kinds of ATM services.

The AAL1 is a connection-oriented service requiring a predetermined bit transmitting speed, is able to control the transmission time, but has a delaying element.

The AAL2 is a connection-oriented service which does not require a predetermined transmission speed. A method for processing a corresponded layer in ATM is a method for accepting a variable bit rate requiring a real time processing in the ATM network, and the method transmits various user data carried on an ATM cell through an ATM layer connection having one visual channel/path internet protocol (IP).

The AAL3/4 is a service applied when variable speed is required for both of connection-oriented and non-connection type.

The AAL5 is a service for supplying high speed service by simplifying the function of AAL3/4. The method for processing corresponded ATM layer is for accepting connection-oriented/non-connecting upper applied user data of non-real time and of variable length in the ATM network. And the above method is suggested for packet or IP service mainly.

FIG. 1 is a conceptual view showing a location of VoDSL and a structure of AAL2 area.

A voice over digital subscribe line (VoDSL) is a technology for transmitting voice using its variations digital subscriber line (xDSL), the xDSL is able to transmit data, however, it does not support real time data transmission. Also, excessive delay is generated to make the voice phone call not be smooth.

Therefore, the VoDSL adds the AAL2 area on the basis of the ATM to perform real time voice process, and adds AAL5 area to perform the data transmission.

FIG. 2 is a block diagram showing a telephone network connected to the conventional apparatus for receiving voice signal and data.

The conventional apparatus for receiving voice signal and data comprises: a splitter 10 for dividing a signal inputted from an outer data transmission unit (not shown) into an IP data packet and a voice signal; a first telephone (TP) 30 connected to a POTS channel of the splitter 10 for receiving the voice signal divided in the splitter 10; and an integrated access device (IAD) 20 for receiving the IP data packet divided in the splitter 10, changing it to voice signal, and applying the same to a plurality of second telephones 40 connected to a data network, and for changing the voice signal inputted from the plurality of second telephones 40 into the IP data packet and outputting the same through the data network.

The operation of the conventional apparatus for receiving voice signal and data will be described as follows.

To begin with, the splitter 10 divides the data inputted through digital subscriber line (DSL) from the outer data transmission unit into a voice signal and a IP data packet, applies the IP data packet to the IAD 20, and applies the voice signal to the first telephone (TP) 30 connected to an analog POTS. Accordingly, the user receives the voice signal through the first telephone (TP) 30, and transmits the voice signal through the first telephone (TP) 30 to perform a voice telephone call.

On the other hand, the IAD 20 transforms the IP data packet applied from the splitter 10 into the voice signal, and applies to the second telephone connected to the IAD 20.

The general telephone 40 transforms the voice signal into voice to provide the user, and changes the voice inputted through the second telephone 40 by the user into the voice signal to apply the above voice signal to the IAD 20.

In addition, the IAD 20 transforms the voice signal applied from the second telephone 40 into the IP data packet, and after that, transmits the IP data packet to the outer data transmission unit as passing through the splitter 10 to perform the voice telephone call.

That is, the IAD 20 operates various chips therein to transform the IP data packet inputted from the data network into the voice signal, and applies the voice signal to the second telephone 40. In addition, the IAD 20 transforms the voice signal inputted from the second telephone 40 into the IP data packet, and applies the IP data packet to the data network to perform the voice telephone call. However, the IAD 20 does not work unless electric power is applied, and therefore, the voice telephone call is not able to be performed using the telephone connected to the data network in power failure.

Also, if a network error is generated, and an error is generated in the CPU inside the IAD, the voice telephone call using the data network is impossible.

SUMMARY OF THE INVENTION

Therefore, an object of the present invention is to provide an apparatus for receiving a voice signal and data and a controlling method thereof by which a voice telephone call can be made using a telephone connected to IAD even in power failure or network error by connecting the telephone connected to the IAD to a data network or a voice network according to a power supplying status using a relay which is operated electrically.

To achieve the object of the present invention, there is provided an apparatus for receiving a voice signal and data comprising: a splitter for dividing data transmitted from a data transmission unit into an internet protocol data packet and a voice signal; a first telephone connected to an analog plain old telephone service (POTS) channel of the splitter for receiving the voice signal divided in the splitter; and an integrated access device (IAD) for connecting a second telephone to a voice line, that is, the analog POTS channel of the splitter or connecting the second telephone to a data line of the splitter according to state of power failure.

To achieve the object of the present invention, there is provided an apparatus for receiving a voice signal and data comprising: a splitter for dividing data transmitted from a data transmission unit into an internet protocol data packet and a voice signal; a first telephone connected to an analog POTS channel of the splitter for receiving the voice signal divided in the splitter; an AND gate for being applied a signal representing network status and a signal representing CPU status and AND calculating the signals; a transistor which is turned on/off according to an output signal of the AND gate; and an integrated access device (IAD) including a relay which is turned on/off electrically by the turning on/off of the transistor.

To achieve the object of the present invention, there is also provided a method for controlling an apparatus for receiving voice signal and data comprising the steps of: deciding whether or not electric source is applied normally to the IAD; performing voice telephone call by connecting a second telephone connected to the IAD to a data line of splitter, when the electric source is applied to the IAD normally; and performing voice telephone call by connecting the voice line of the splitter to a second telephone connected to the IAD if the electric source is not normally applied to the IAD.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
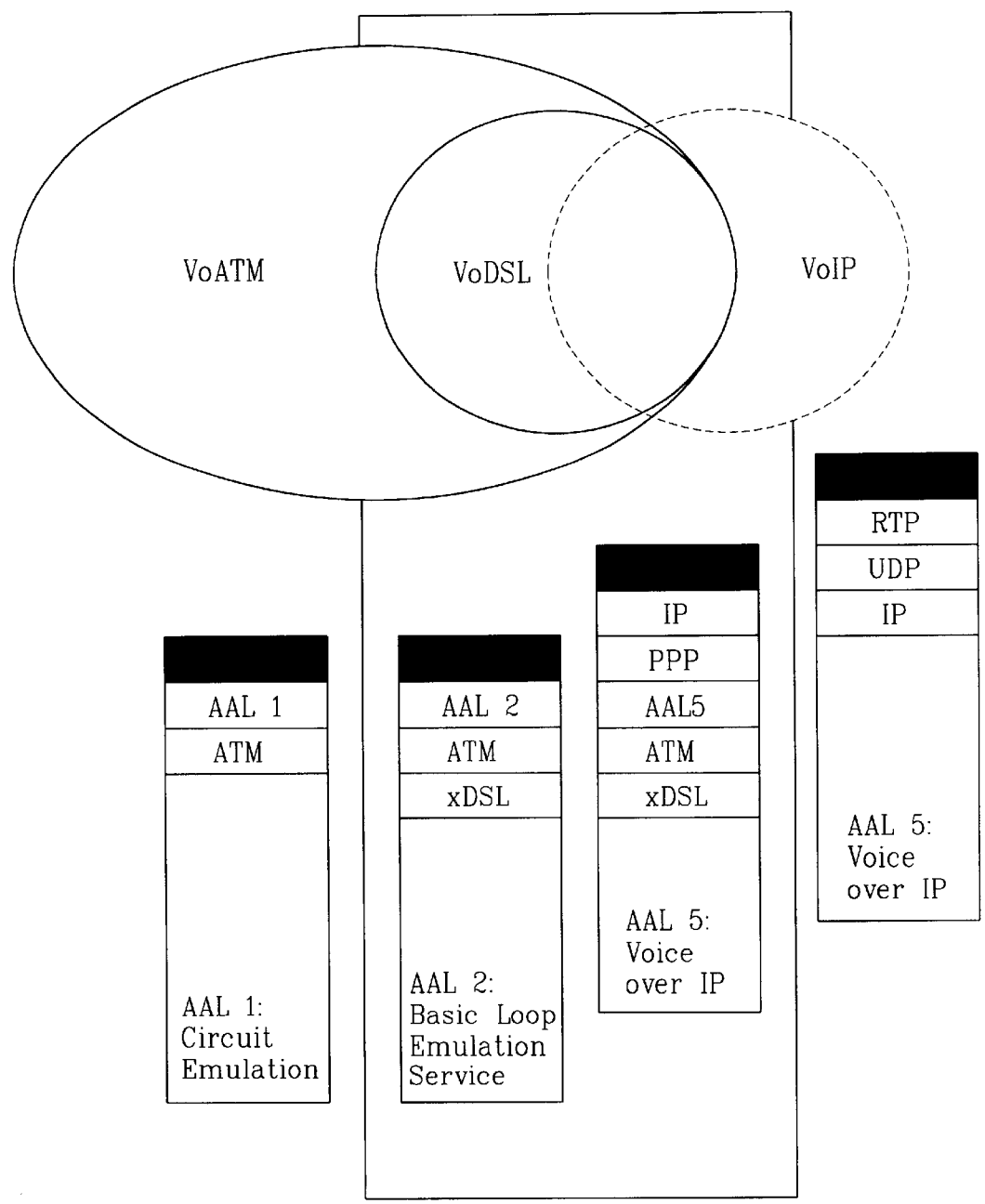
FIG. 1 is a conceptual view showing a location of VoDSL and a structure of AAL2 area.
Figure 2:
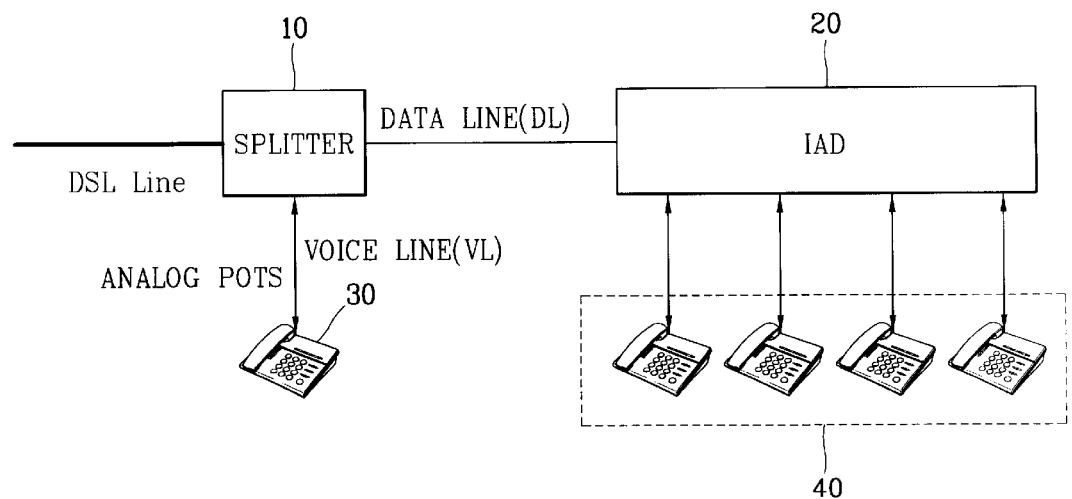
FIG. 2 is a block diagram showing a structure of conventional apparatus for receiving voice signal and data.
Figure 3:
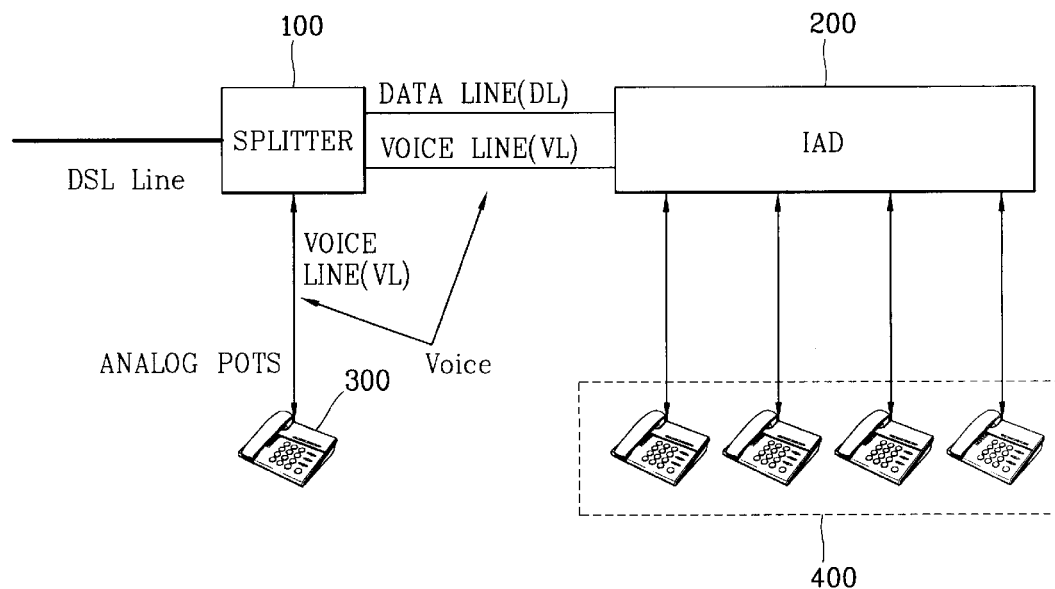
FIG. 3 is a conceptual view showing a structure of an apparatus for receiving voice signal and data according to the present invention.

FIG. 3 is a block diagram showing a structure of an apparatus for receiving voice signal and data according to the present invention.

As shown therein, the apparatus for receiving voice signal and data comprises: a splitter 100 for dividing a signal inputted through a digital subscriber line (DSL) from an outer data transmission unit (not shown) into an internet protocol data packet and a voice signal and outputting them; a first telephone 300 connected to an analog plain old telephone service (POTS) channel of the splitter 100 for receiving the voice signal outputted from the splitter 100; and an integrated access device (IAD) 200 for connecting a plurality of second telephones 400 to a data line or a voice line of the splitter 100 according to the power supplying status, and for transforming the internet protocol data packet outputted from the splitter 100 into the voice signal to apply the signal to the second telephone 400 or for transforming the voice signal inputted through the second telephone 400 into the internet protocol data packet to output the packet to the data transmission unit through a data network.

The IAD 200 comprises a relay 210 which connects the second telephones 400 to the voice line or to the data line of the splitter 100 according to the states of power source, network, and CPU.

The structure of IAD 200 will be described in more detail with reference to FIGS. 4 and 5.

Figure 4:
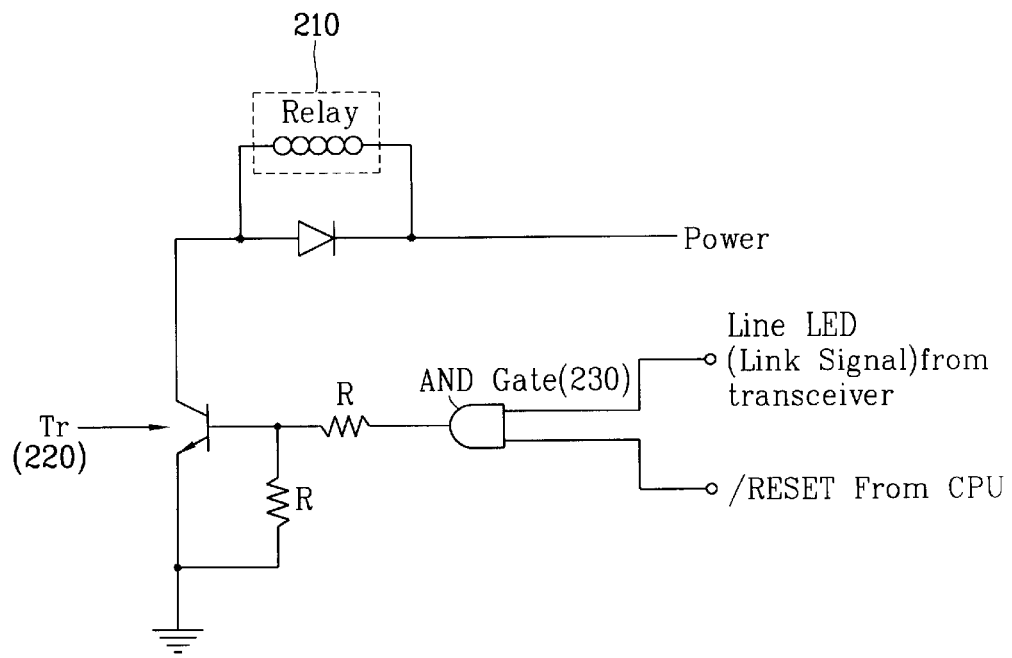
FIG. 4 is a circuit diagram showing an inner structure of IAD shown in FIG. 3.
Figure 5:
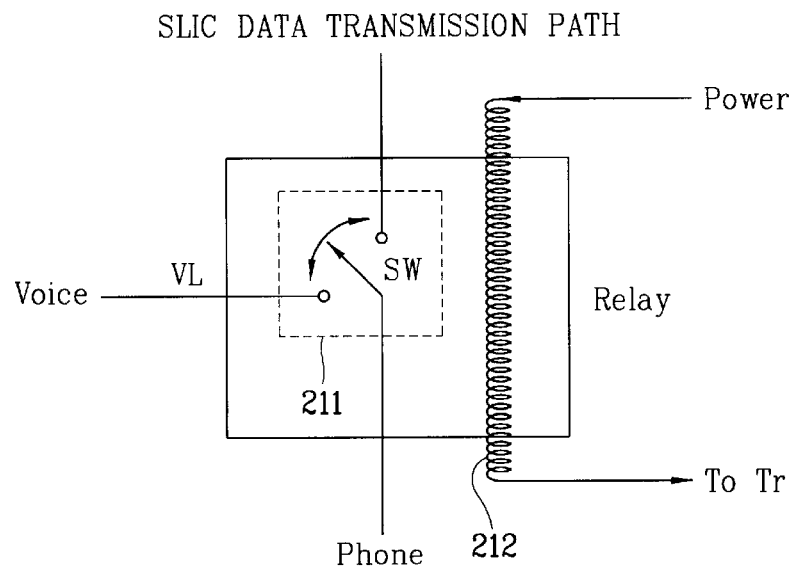
FIG. 5 is a circuit diagram showing a detailed structure of the relay shown in FIG. 4.

FIG. 4 is a circuit diagram showing an inner structure of the IAD shown in FIG. 3, and FIG. 5 is a circuit diagram showing a detailed structure of the relay shown in FIG. 4.

The IAD 200 comprises a relay 210 which connects the second telephones 400 to the data line or to the voice line of the splitter 100 according to the power supplying state; an AND gate 230 for outputting a signal representing the states of the network and CPU by AND calculating the signal representing the network status and the signal representing the CPU status; and a transistor 220 for applying or closing the power source to the relay as being turned on/off by the signal outputted from the AND gate 230.

The relay 210 comprises a switch 211 for connecting the second telephones 400 to the data line or the voice line of the splitter 100 according to the power supplying status, and a coil 212 for providing the switch 211 with the electric power.

The operation of the apparatus for receiving the voice signal and data will be described with reference to FIGS. 3, 4, and 5 as follows.

A case that the electric power is supplied normally and the network and CPU operate normally will be described.

The splitter 100 divides the data received through the DSL line into the voice signal and the internet protocol data packet, applies the voice signal to the first telephone 300 connected to the analog POTS, and applies the internet protocol data packet to the IAD 200.

The first telephone 300 transforms the applied voice signal to voice so that the user can hear the voice of a counterpart. Also, the first telephone transmits the voice signal of the user to the data transmission unit through the analog POTS of the splitter 100 to perform the voice telephone call.

On the other hand, the IAD 200 receives the internet protocol data packet outputted from the splitter 100, transforms the internet protocol packet into the voice signal to apply the voice signal to the second telephone 400 connected to the IAD 200 through the relay.

That is, when the transistor 220 in the IAD 200 is turned on to supply the electric power to the relay 210, the switch 211 in the relay 210 connects the second telephone 400 to the data line of the splitter 100. Accordingly, the second telephone 400 receives the voice signal from the IAD 200 and provides the user with the voice. The user hears the voice through the second telephone 400, and after that, applies the voice signal to the IAD 200 through the second telephone 400.

The IAD 200 transforms the applied voice signal into the internet protocol data packet, and transmits the packet to the data transmission unit (not shown) through the splitter 100 to perform the voice telephone call.

Hereinafter, a method for processing voice signal by the IAD 200 in case that the network and CPU operates normally and a power failure is generated will be described.

When the power is turned off, the IAD 200 stops operating since the electric power is not supplied to the IAD 200. In addition, the switch 211 of the relay 210 in the IAD 200 connects the second telephones 400 to the voice line of the analog POTS in the splitter 100, and applies the voice signal inputted into the splitter 200 to the second telephones 400.

The voice line of the splitter 100 is able to make a call even in power failure by the electric power supplied from a telephone office using the conventional telephone network (PSTN), and therefore, the user can perform a voice telephone call using the second telephone 400 connected to the IAD 200 in the power failure.

Next, a case that the power is turned on, and there is an error in the network will be described.

When a signal of an LED indicator in the DSL transceiver representing the network error is inputted into the AND gate 230 of the IAD 200, the AND gate 230 outputs a low potential signal to the transistor 220 by the inputted signal.

The transistor 220 is turned off by the inputted low potential signal, and turns off the electric source applied to the relay 210.

When the electric source applied to the relay 210 is turned off, the switch 211 of the relay 210 connects the second telephone 400 to the voice line of the splitter 100 to apply the received voice signal to the second telephone 400.

The second telephone 400 provides the user with the voice, receives the voice signal pronounced by the user, and transmits the voice signal to the data transmission unit (not shown) through the voice line of the splitter 100 to perform the voice telephone call.

Lastly, a method for controlling voice signal by the IAD in case that the power and network operate normally, and an error is generated in setup operation of the CPU will be described as follows.

If the CPU is not set up normally since a reset signal of the CPU is not converted to high state, the PCU outputs a reset signal, that is, a low potential signal representing the state of the CPU to the AND gate 230.

The AND gate 230 turns the transistor 220 off by the inputted low potential signal, and turns off the electric power applied to the relay. Accordingly, the switch 211 of the relay 210 connects the second telephone 400 to the voice line of the splitter 100, and therefore, the user is able to perform a voice telephone call using the second telephone 400 connected to the IAD 200 regardless of the setup operation of the CPU.

Consequently the present invention uses the relay which operates electrically, that is, the switch of the relay is connected to the data line of the splitter when the electric power is supplied normally, and the switch of the relay is connected to the voice line of the splitter in the power failure state, and thereby the voice telephone call can be made always.

Also, the switch of the relay is connected to the voice line of the splitter when the error is generated in the network or the CPU performs the setup operation, and thereby the voice telephone call can be made always.

As described above, according to the present invention, a plurality of internet phones can be used normally even in the power failure, inner CPU error, or network error by connecting the telephone to the data line or to the voice line according to the electric power supplying states using the relay which is operated electrically.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for receiving a voice signal and data comprising:

a splitter for dividing data transmitted from a data transmission unit into an internet protocol data packet and a voice signal;

a first telephone connected to an analog POTS channel of the splitter for receiving the voice signal divided in the splitter; and an integrated access device (IAD) for connecting a second telephone to a voice line, that is, the analog POTS channel of the splitter or connecting the second telephone to a data line of the splitter according to state of power failure, wherein the IAD comprises:

an AND gate for AND calculating after being applied a signal representing state of the network and a signal representing the CPU state;

a transistor turned on/off by the output signal of the AND gate; and a relay which is turned on/off electrically by the turning on/off of the transistor.

2. The apparatus of claim 1, wherein the AND gate outputs a low potential signal for turning off the electric power supplied to the relay when the CPU is not set up and a reset signal is inputted.

3. The apparatus of claim 1, wherein the relay connects a switch thereof to a data line of the splitter when the electric power is supplied normally, and connects the switch to a voice line of the splitter in power failure state.

4. The apparatus of claim 1, wherein the relay connects a switch thereof to a data line of the splitter when the network is operated normally, and connects the switch to a voice line of the splitter when an error is generated on the network.

5. The apparatus of claim 1, wherein the relay connects a switch thereof to a data line of the splitter when the CPU is operated normally, and connects the switch to a voice line of the splitter when the CPU is in the state of reset.

6. The apparatus of claim 1, wherein the AND gate recognizes a signal of an LED indicator in a digital subscribe line (DSL) transceiver representing the state of network, and outputs a low potential signal to turn off the electric power supplied to the relay when the signal of LED indicator is recognized.

7. An apparatus for receiving a voice signal and data comprising:
- a splitter for dividing data transmitted from a data transmission unit into an internet protocol data packet and a voice signal;
- a first telephone connected to an analog POTS channel of the splitter for receiving the voice signal divided in the splitter; and
- an integrated access device (IAD) including an AND gate for being applied a signal representing network status and a signal representing CPU status and AND calculating the signals, a transistor which is turned on/off according to an output signal of the AND gate, and a relay which is turned on/off electrically by the turning on/off of the transistor.

8. The apparatus of claim 7, wherein the AND gate recognizes a signal of an LED indicator in a digital subscribe line (DSL) transceiver representing the state of network, and outputs a low potential signal to turn off the electric power supplied to the relay when the signal of LED indicator is recognized.

9. The apparatus of claim 7, wherein the relay connects a switch thereof to a data line of the splitter when a network is operated normally, and connects the switch to a voice line of the splitter when an error is generated on the network.

10. The apparatus of claim 7, wherein the relay connects a switch thereof to a data line of the splitter when the CPU is operated normally, and connects the switch to a voice line of the splitter when the CPU is in the state of reset.

11. The apparatus of claim 7, wherein the AND gate outputs a low potential signal for turning off the electric power supplied to the relay when the CPU is not set up and a reset signal is inputted.

* * * * *